(12) United States Patent
Wang et al.

(10) Patent No.: US 11,692,049 B2
(45) Date of Patent: Jul. 4, 2023

(54) ADDITIVELY MANUFACTURED THERMOSET POLYMERS FOR METAL PLATING AND METAL PLATED PARTS FORMED THEREFROM

(71) Applicant: Ford Global Technologies, LLC, Dearborn, MI (US)

(72) Inventors: Xiaojiang Wang, Saline, MI (US); Shannon Christine Bollin, South Lyon, MI (US); Robert D. Bedard, Allen Park, MI (US); Matthew Cassoli, Dearborn, MI (US); Ellen Cheng-chi Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 17/025,397

(22) Filed: Sep. 18, 2020

(65) Prior Publication Data
US 2022/0089799 A1    Mar. 24, 2022

(51) Int. Cl.
| | |
|---|---|
| C08F 220/18 | (2006.01) |
| C08F 2/48 | (2006.01) |
| C08F 222/10 | (2006.01) |
| C08F 216/12 | (2006.01) |
| C23C 18/16 | (2006.01) |
| C23C 18/20 | (2006.01) |
| C23C 18/38 | (2006.01) |
| C23C 18/32 | (2006.01) |
| C23C 18/50 | (2006.01) |
| B33Y 70/00 | (2020.01) |

(Continued)

(52) U.S. Cl.
CPC .......... *C08F 220/1808* (2020.02); *C08F 2/48* (2013.01); *C08F 216/125* (2013.01); *C08F 220/1804* (2020.02); *C08F 222/102* (2020.02); *C23C 18/1641* (2013.01); *C23C 18/1651* (2013.01); *C23C 18/2013* (2013.01); *C23C 18/32* (2013.01); *C23C 18/38* (2013.01); *C23C 18/50* (2013.01); *B29C 64/129* (2017.08); *B33Y 10/00* (2014.12); *B33Y 70/00* (2014.12)

(58) Field of Classification Search
CPC .... C08F 2/48; C08F 222/102; C08F 216/125; B29C 64/129; B33Y 70/10; B33Y 10/00
USPC ......................................................... 524/556
See application file for complete search history.

(56) References Cited

U.S. PATENT DOCUMENTS

| | | | |
|---|---|---|---|
| 5,354,593 A | * | 10/1994 | Grandmont ......... H01L 21/4857 428/209 |
| 7,230,188 B1 | | 6/2007 | En et al. |
| 9,993,982 B2 | | 6/2018 | Sherrer et al. |

(Continued)

FOREIGN PATENT DOCUMENTS

EP        1098558        2/2008

*Primary Examiner* — Michael M. Bernshteyn
(74) *Attorney, Agent, or Firm* — Burris Law, PLLC

(57) ABSTRACT

A thermoset resin for forming parts to be metal plated includes a vat photopolymerization (VPP) thermoset resin and an etchable phase disposed in the VPP thermoset resin. The etchable phase is etched from a surface of a part formed from the VPP thermoset resin such that a plurality of micro-mechanical locking sites is formed on the surface of the part. The etchable phase is at least one of organic particles, organic resins, inorganic particles, and copolymers of the VPP thermoset resin. For example, the etchable phase can be a polybutadiene phase and/or a mineral such as calcium carbonate.

20 Claims, 3 Drawing Sheets

(51) Int. Cl.
*B33Y 10/00* (2015.01)
*B29C 64/129* (2017.01)

(56) References Cited

U.S. PATENT DOCUMENTS

| | | | |
|---|---|---|---|
| 10,676,572 B1 * | 6/2020 | Rodriguez | C08G 75/045 |
| 11,446,858 B2 * | 9/2022 | Belitzky | B29C 64/112 |
| 2018/0290377 A1 * | 10/2018 | Talken | C08F 2/50 |
| 2019/0291346 A1 * | 9/2019 | Rudolph | B33Y 10/00 |

* cited by examiner

ADDITIVELY MANUFACTURED THERMOSET POLYMERS FOR METAL PLATING AND METAL PLATED PARTS FORMED THEREFROM

FIELD

The present disclosure relates to thermoset polymers and particularly to thermoset polymers for metal plating.

BACKGROUND

The statements in this section merely provide background information related to the present disclosure and may not constitute prior art.

Thermoplastic polymers such as acrylonitrile butadiene styrene (ABS) are used to form injection molded parts that are subsequently metal plated. Also, injection molded parts formed from such polymers generally have a "smooth" surface that, after etching, allows for a metal plated coating with a desired surface appearance to be formed on the surface. However, such thermoplastic polymers cannot be used in forming parts via Vat Photopolymerization (VPP) additive manufacturing (AM) techniques, and thermoplastic usage in other AM techniques present aesthetic limitations. For example, ABS has been used to form parts using fused filament fabrication (FFF), however FFF produces visible layer lines on surfaces of formed parts, thereby limiting the smoothness, crispness and/or resolution of graphics that can be produced on the surface of such parts.

These challenges with additive manufacturing via VPP parts from thermoset polymers, among other issues related to thermoset polymers, are addressed by the present disclosure.

SUMMARY

In one form of the present disclosure, a thermoset resin for forming parts to be metal plated includes a vat photopolymerization (VPP) thermoset resin and an etchable phase disposed in the VPP thermoset resin. The etchable phase is configured to be etched from a surface of a part formed from the VPP thermoset resin such that a plurality of micro-mechanical locking sites is formed on the surface of the part.

In some variations, the VPP thermoset resin is a mixture of at least one monomer, at least one oligomer, and at least one photoinitiator. In at least one variation, the VPP thermoset resin includes at least one monomer selected from the group consisting of a (meth)acrylate monomer and a vinyl ether. In such variations, the (meth)acrylate monomer can be at least one of a monofunctional monomer, a difunctional monomer, and a multifunctional monomer. For example, in some variations the (meth)acrylate monomer is at least one of 2-ethyl hexyl acrylate (EHA), n-butyl acrylate (BA), 1,4-butanediol diacrylate (BDDA), diethyleneglycoldiacrylate (DEGDA), bisphenol A-glycidyl methacrylate (Bis-GMA), bisphenol A ethoxylate diacrylate (Bis-EDA), trimethylolpropane triacrylate (TTA), and triethylene glycol dimethacrylate (TEGDMA). Also, in some variations the vinyl ether is at least one of diethyleneglycol divinyl ether (DEGDE), cyclohexane dimethanol divinyl ether (CHDMDE), and triethylene glycol divinyl ether (TEGDE).

In at least one variation, the VPP thermoset resin comprises at least one (meth)acrylated oligomer. And in some variations the VPP thermoset resin comprises at least one oligomer selected from the group consisting of polyurethane (meth)acrylate, polyether (meth)acrylate, polyester (meth) acrylate, epoxy (meth)acrylate, phenolic (meth)acrylate, amino (meth)acrylate, and silicone (meth)acrylate.

In at least one variation, the etchable phase is selected from the group consisting of organic particles, organic resins, inorganic particles, and copolymers of the VPP thermoset resin. In such variations, the etchable phase can be selected from the group consisting of polybutadiene (meth)acrylate, polyisoprene (meth)acrylate, polychlorprene (meth)acrylate, unsaturated polyester (meth)acrylate, alkyd (meth)acrylate, (meth)acrylated polymers with backbones or side chains comprising unsaturated double bond function group ($-CH_2=CH_2-$), iron (Fe), aluminum (Al), alumina ($Al_2O_3$), magnesium oxide (MgO), zinc oxide (ZnO), calcium carbonate ($CaCO_3$), barium carbonate ($BaCO_3$), and magnesium carbonate ($MgCO_3$).

In some variations a component is formed from the VPP thermoset resin with the etchable phase disposed therein, and the component has an etched surface and a metal coating disposed on the etched surface. In at least one variation the metal coating is a chromium coating. And in some variations the metal coating is a layer of nickel, a layer of copper, and a layer of chromium.

In another form of the present disclosure a metal plated polymer part includes a VPP thermoset substrate formed from a mixture of at least one monomer, at least one oligomer, at least one photoinitiator, and an etchable phase, and a metal coating on a surface of the VPP thermoset substrate. Also, the surface is an etched surface with a plurality of micro-mechanical locking sites and the metal coating is bonded to the surface at the plurality of micro-mechanical locking sites.

In some variations, the VPP thermoset substrate is formed from a VPP thermoset resin with at least one monomer that is a (meth)acrylate monomer and/or a vinyl ether. In such variations, the (meth)acrylate monomer is at least one of 2-ethyl hexyl acrylate (EHA), n-butyl acrylates (BA), 1,4-butanediol diacrylate (BDDA), diethyleneglycoldiacrylate (DEGDA), bisphenol A-glycidyl methacrylate (Bis-GMA), bisphenol A ethoxylate diacrylate (Bis-EDA), trimethylolpropane triacrylate (TTA), and triethylene glycol dimethacrylate (TEGDMA), and the vinyl ether is at least one of diethyleneglycol divinyl ether (DEGDE), cyclohexane dimethanol divinyl ether (CHDMDE), and triethylene glycol divinyl ether (TEGDE).

In at least one variation, the VPP thermoset resin includes at least one (meth)acrylated oligomer such as of polyurethane (meth)acrylate, polyether (meth)acrylate, polyester (meth)acrylate, epoxy (meth)acrylate, phenolic (meth)acrylate, amino (meth)acrylate, and silicone (meth)acrylate, among others.

In some variations, the etchable phase is selected from the group consisting of polybutadiene (meth)acrylate, polyisoprene (meth)acrylate, polychlorprene (meth)acrylate, unsaturated polyester (meth)acrylate, alkyd (meth)acrylate, (meth)acrylated polymers with backbones or side chains comprising unsaturated double bond function group ($-CH_2=CH_2-$), iron (Fe), aluminum (Al), alumina ($Al_2O_3$), magnesium oxide (MgO), zinc oxide (ZnO), calcium carbonate ($CaCO_3$), barium carbonate ($BaCO_3$), and magnesium carbonate ($MgCO_3$).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
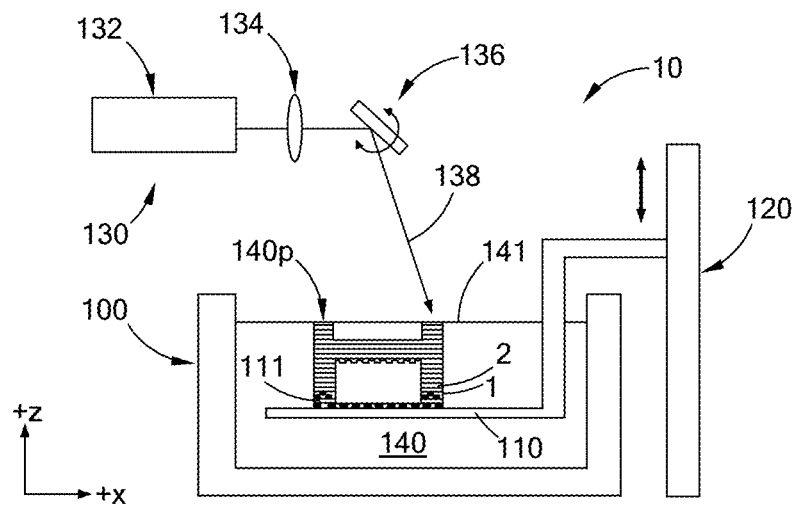
FIG. 1 shows a stereolithography system for additive manufacturing a thermoset resin according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a thermoset resin for forming parts via vat photopolymerization (VPP), and the VPP formed parts can be metal plated using standard or conventional metal plating techniques and equipment. The thermoset resin includes a VPP thermoset resin and an etchable phase disposed in the VPP thermoset resin. The thermoset resin is particularly well suited for forming parts using stereolithography (SLA) additive manufacturing (AM), digital light processing (DLP) AM and continuous liquid interface production (CLIP) AM. The VPP formed parts are etched and then metal plated using standard or conventional metal plating techniques and equipment. As used herein the term "photopolymerization" refers to synthesis of polymers by chain reactions that are initiated and propagated upon the absorption of light (e.g., ultraviolet light) by a polymerizable system, light serving only as an initiating tool that does not interfere with the propagation and termination stages of the chain process.

Figure 2:
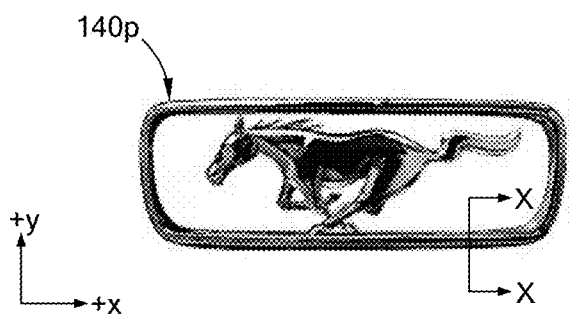
FIG. 2 is a side view of a metal plated part formed via vat photopolymerization of a thermoset resin according to the teachings of the present disclosure.

Referring to FIG. 1, a stereolithography (SLA) system 10 is shown. The SLA system 10 includes a vat 100, a platform 110, an elevator 120 configured to move the platform 110 up (+z direction) and down (−z direction), and a light scanning system 130. A VPP thermoset resin 140 (also referred to herein simply as "thermoset resin") is disposed within the vat 100. The light scanning system 130 includes a light source 132, e.g., an ultraviolet laser, light beam shaping optics 134, and an x-y scanner 136 (e.g., a mirror) configured to directed a light beam 138 along a predefined pattern on a surface 141 of the thermoset resin 140 disposed in the vat 100. The platform 110 can include a support 111 on which AM of a part 140p is formed layer-by-layer. For example, a first layer '1' of cured thermoset resin 140c (FIG. 3) is formed by positioning the platform 110 and/or the support 111 just below (−z direction) the surface 141 of the thermoset resin 140 such that a layer of predefined thickness (z direction) of the thermoset resin 140 is disposed on the platform and/or support 111. Then, the light scanning system 130 directs the light beam 138 along the predefined pattern to form a first layer '1' of cured thermoset resin 140c. And after the first layer 1 of cured thermoset resin 140c is formed, the elevator 120 moves the platform 110 down (−z direction) a predefined distance such that a second layer '2' of the thermoset resin 140 flows and is disposed over the first layer 1 of cured thermoset resin 140c. Then, the light scanning system 130 directs the light beam 138 along another predefined pattern, which may be the same or different than the previous predefined pattern, to form the second layer 2 of cured thermoset resin 140c. This cycle continues until an AM part 140p is completely formed, layer-by-layer. An example of such an AM part 140p formed using the AM technique described above is shown in FIG. 2.

While FIG. 1 provides an example of one type of AM system and/or technique, it should be understood that other AM techniques such as, but not limited to, DLP AM and CLIP AM can be used for forming AM parts with the thermoset resin according to the teachings of the present disclosure.

Figure 3:
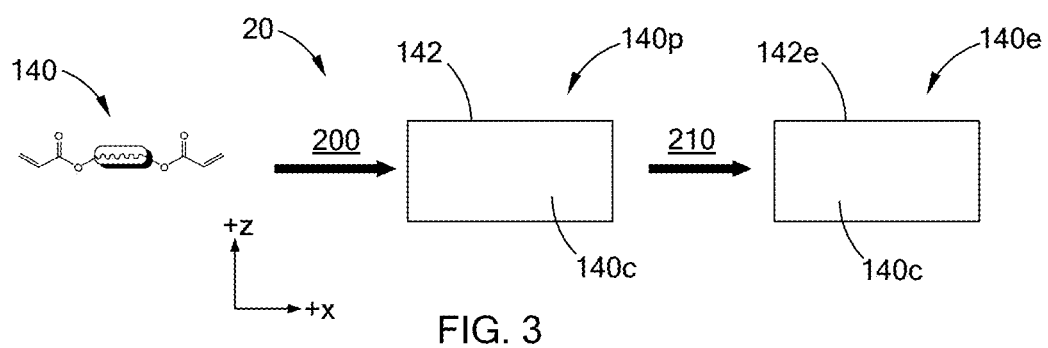
FIG. 3 is a cross-sectional view of a substrate, before and after etching of the substrate, formed from a resin according to the prior art via vat photopolymerization.

Referring to FIG. 3, a method 20 of forming an etched AM part 140e using a VPP thermoset resin 140 known in the art is shown. Particularly, the VPP thermoset resin 140 is used to form the AM part 140p layer-by-layer at step 200 and the AM part 140p is etched at step 210 to form the etched AM part 140e. The AM part 140p is formed from successive layers of cured thermoset resin 140c as discussed above, and has a surface 142 that is exposed to an etchant at step 210 such that an etched surface 142e is provided. Not limiting examples of etchants used to etch the surface 142 include oxidizing acid solutions such as $MnO_2$—$H_2SO_4$ etchants, $MnO_2$—$H_3PO_4$—$H_2SO_4$ etchants, chromic acid etchants, among others.

As shown in FIG. 3, the etched surface 142e is without the presence of or does not have micro-mechanical bonding sites for bonding a metal coating (not shown) to the etched surface 142e. That is, the VPP thermoset resin 140 does not have any phase(s) or particles that are suitable for removal via etching. Accordingly, it should be understood that the etched surface 142e does not lend itself to metal plating since the lack of micro-mechanical bonding sites on the etched surface 142e inhibits bonding of a metal coating deposited onto the etched surface 142e.

Figure 4:
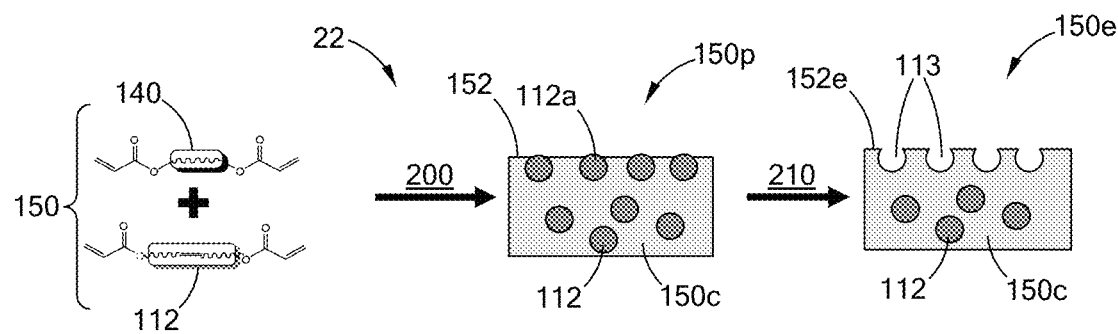
FIG. 4 is a cross-sectional view of a substrate, before and after etching of the substrate, formed via vat photopolymerization using a resin according to one form of the present disclosure.

Referring now to FIG. 4, a method 22 of forming an etched AM part 150e using a thermoset resin 150 according to the teachings of the present disclosure is shown. Particularly, the thermoset resin 140 in FIG. 1 is replaced with the thermoset resin 150. Also, the thermoset resin 150 includes the VPP thermoset resin 140 and an etchable phase 112 disposed in the VPP thermoset resin 140. In the example shown in FIG. 4, the etchable phase 112 is the in the form of a resin phase that can be etched with known etchants such those listed above. Non-limited examples of such resin phases include polybutadiene (meth)acrylate, polyisoprene (meth)acrylate, polychlorprene (meth)acrylate, unsaturated polyester (meth)acrylate, alkyd (meth)acrylate, and other types of (meth)acrylated polymers which contain of unsaturated double bond function group (—CH$_2$═CH$_2$—) on their backbones or side chains.

In some variations, the VPP thermoset resin 140 is a mixture of at least one monomer, at least one oligomer, and at least one photo initiator. Non-limiting examples of the at least one monomer include an (meth)acrylate monomer, a vinyl ether, among others. Also, the (meth)acrylate monomer can be at least one of a monofunctional monomer, a difunctional monomer, and a multifunctional monomer. For example, in some variations the (meth)acrylate monomer is at least one of 2-ethyl hexyl acrylate (EHA), n-butyl acrylates (BA), 1,4-butanediol diacrylate (BDDA), diethyleneglycoldiacrylate (DEGDA), bisphenol A-glycidyl methacrylate (Bis-GMA), bisphenol A ethoxylate diacrylate (Bis-EDA), trimethylolpropane triacrylate (TTA), and triethylene glycol dimethacrylate (TEGDMA), among others. Also, the vinyl ether can be at least one of diethyleneglycol divinyl ether (DEGDE), cyclohexane dimethanol divinyl ether (CHDMDE), and triethylene glycol divinyl ether (TEGDE), among others.

In at least one variation, the VPP thermoset resin(s) of the present disclosure includes at least one acrylated oligomer. And in some variations, the at least one oligomer is polyurethane (meth)acrylate, polyether (meth)acrylate, polyester (meth)acrylate, epoxy (meth)acrylate, phenolic (meth)acrylate, amino (meth)acrylate, and silicone (meth)acrylate, among others.

Similar to forming the AM part 140$p$ in FIG. 3, an AM part 150$p$ is formed layer-by-layer at step 200 using the thermoset resin 150 and the AM part 150$p$ is etched at step 210 to form the etched AM part 150$e$. However, and in contrast to the AM part 140$p$ formed from the thermoset resin 140, the etchant removes or dissolves the etchable phase 112 from the thermoset resin 150 at the surface 152 such that a plurality of micro-mechanical bonding sites 113 are formed on an etched surface 152$e$. It should be understood that the micro-mechanical bonding sites 113 enhance bonding of a metal coating deposited on the etched surface 152$e$ as shown and discussed below with reference to FIG. 7.

Figure 5:
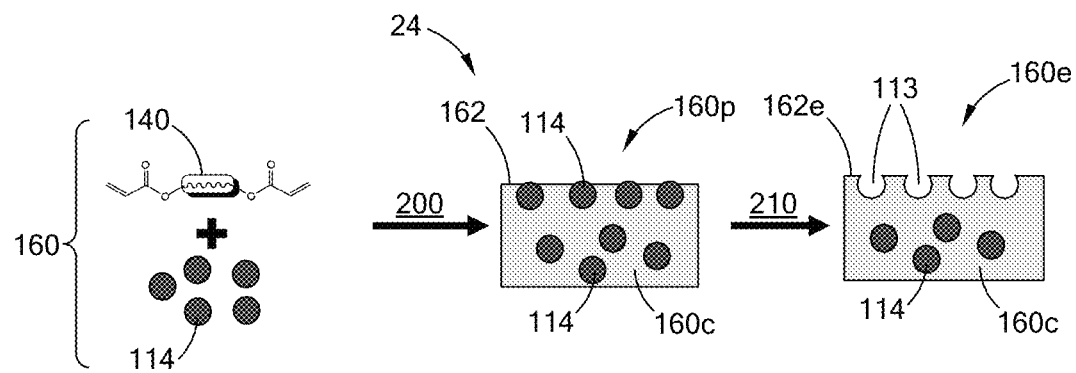
FIG. 5 is a cross-sectional view of a substrate, before and after etching of the substrate, formed via vat photopolymerization using a resin according to another form of the present disclosure.

Referring now to FIG. 5, a method 24 of forming an etched AM part 160$e$ using a thermoset resin 160 according to the teachings of the present disclosure is shown. Particularly, the thermoset resin 140 in FIG. 1 is replaced with the thermoset resin 160. Also, the thermoset resin 160 includes the VPP thermoset resin 140 and another etchable phase 114 disposed in the VPP thermoset resin 140. In the example shown in FIG. 5, the etchable phase 114 is the in the form of particles (also referred to herein as "etchable particles 114") that can be etched with known etchants such as those listed above. Non-limited examples of such particles include particles of metal particles including iron (Fe) and aluminum (Al), metal oxide particles including alumina (Al$_2$O$_3$), magnesium oxide (MgO) and zinc oxide (ZnO), and metal carbonate particles including calcium carbonate (CaCO$_3$), barium carbonate (BaCO$_3$), magnesium carbonate (MgCO$_3$), among others.

Similar to forming the AM part 140$p$ in FIG. 3, an AM part 160$p$ is formed layer-by-layer at step 200 using the thermoset resin 160 and the AM part 160$p$ is etched at step 210 to form the etched AM part 160$e$. The AM part 160$p$ is formed from successive layers of cured thermoset resin 160$c$ and has a surface 162 that is exposed to an etchant at step 210 such that an etched surface 162$e$ is provided. However, and in contrast to the AM part 140$p$ formed from the thermoset resin 140, the etchant removes or dissolves the etchable particles 114 at the etched surface 162$e$ such that a plurality of micro-mechanical bonding sites 113 are formed on the etched surface 162$e$. It should be understood that the micro-mechanical bonding sites 113 enhance bonding of a metal coating deposited on the etched surface 162$e$ as discussed below with reference to FIG. 7.

Figure 6:
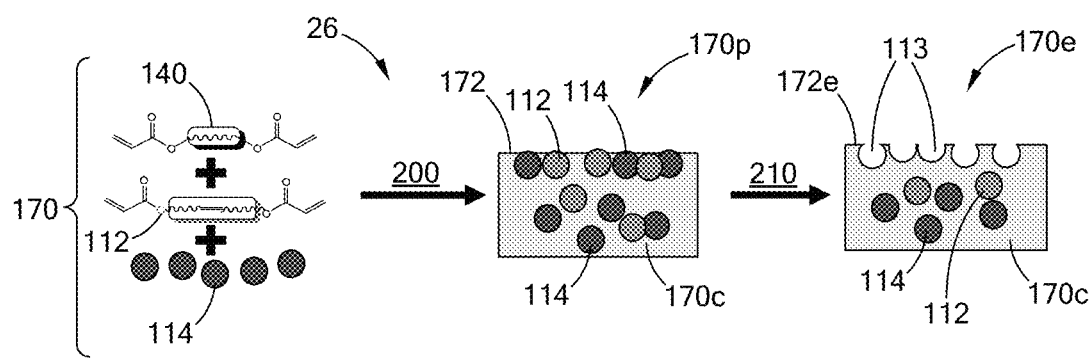
FIG. 6 is a cross-sectional view of a substrate, before and after etching of the substrate, formed via vat photopolymerization using a resin according to yet another form of the present disclosure.

Referring to FIG. 6, a method 26 of forming an etched AM part 170$e$ using a thermoset resin 170 according to the teachings of the present disclosure is shown. Particularly, the thermoset resin 140 in FIG. 1 is replaced with the thermoset resin 170. Also, the thermoset resin 170 includes the VPP thermoset resin 140, the etchable phase 112, and the etchable particles 114 disposed in the VPP thermoset resin 140.

Similar to forming the AM part 140$p$ in FIG. 3, an AM part 170$p$ is formed layer-by-layer at step 200 using the thermoset resin 170 and the AM part 170$p$ is etched at step 210 to form the etched AM part 170$e$. The part 170$p$ is formed from successive layers of cured thermoset resin 170$c$ and has a surface 172 that is exposed to an etchant at step 210 such that an etched surface 172$e$ is provided. However, and in contrast to the AM part 140$p$ formed from the thermoset resin 140, the etchant removes or dissolves the etchable phase 112 and the etchable particles 114 at the etched surface 172$e$ such that a plurality of micro-mechanical bonding sites 113 are formed on the etched surface 172$e$. It should be understood that the micro-mechanical bonding sites 113 enhance bonding of a metal coating deposited on the etched surface 172$e$ as discussed below.

Figure 7:
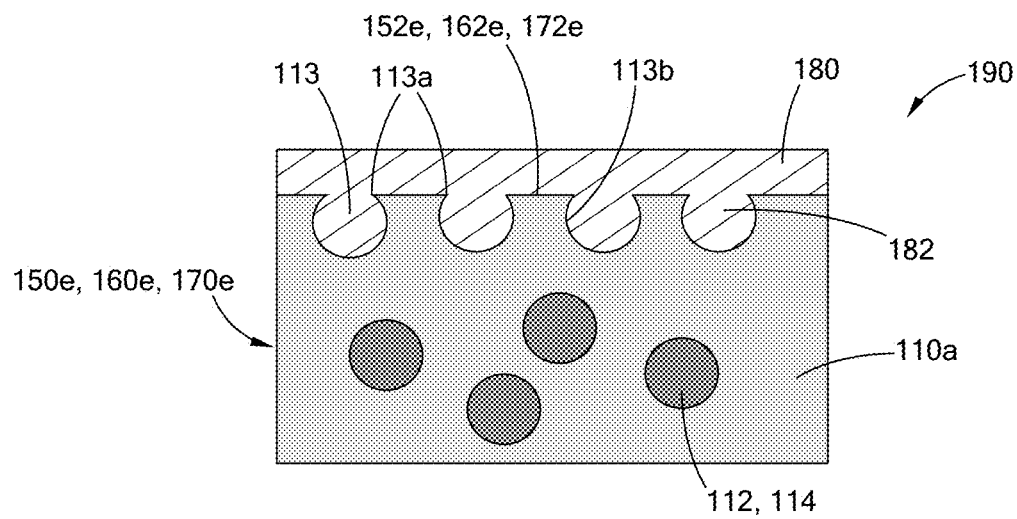
FIG. 7 is a cross-sectional view of the substrates in FIGS. 4-6, after etching of the substrate, and after metal plating of the etched substrate according to the teachings of the present disclosure.

Referring now to FIG. 7, the etched AM part 150$e$, 160$e$, 170$e$ is shown with a metal coating 180 applied and bonded to the etched surface 152$e$, 162$e$, 172$e$ such that a metal coated AM part 190 is provided. The micro-mechanical bonding sites 113 provide edges 113$a$ and undercut areas 113$b$ that enhance the bonding (e.g., mechanical bonding) of the metal coating 180 to the etched AM part 150$e$, 160$e$, 170$e$. In addition, the micro-mechanical bonding sites 113 provide volumes of void space within which metal 182 deposits during deposition of the metal coating 180 such that at least a portion of the metal coating 180 is encapsulated within the etched surface 152$e$, 162$e$, 172$e$ of the etched AM part 150$e$, 160$e$, 170$e$. In addition, the micro-mechanical bonding sites 113 provide for metal plating of AM parts formed from thermoset resins using standard or conventional metal plating techniques and equipment. Non-limiting examples of such standard or conventional metal plating techniques include electroplating, electroless plating, physical vapor deposition (PVD), vacuum metallization and spray metal coating, among other. And non-limiting examples of standard or conventional metal plating equipment include, racks, dip tanks, metallization chambers, and plasma arc guns, among others. Also, non-limiting examples of the metal coating 180 include a chromium or chromium alloy coating, a nickel or nickel alloy coating, a copper or copper alloy coating, an aluminum or aluminum alloy coating, and combinations thereof, among others.

Figure 8:
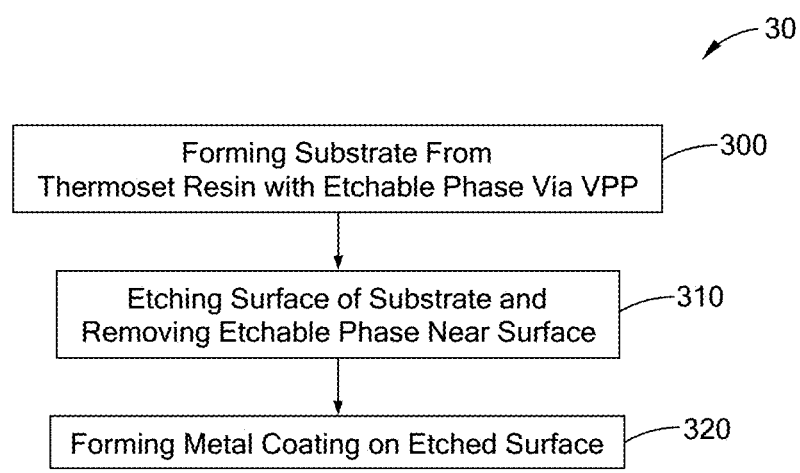
FIG. 8 is a flow chart for a method 30 of forming a metal plated part according to the teachings of the present disclosure.

Referring now to FIG. 8, a flow chart for a method 30 of forming a metal plated part is shown. The method 30 includes forming a substrate from a thermoset resin with an etchable phase via VPP at 300 and etching a surface of the substrate at 310. Etching of the surface removes at least a portion of the etchable phase proximate the surface of the substrate and forms a plurality of micro-mechanical locking sites at 310 at the surface. Then, a metal coating is deposited or formed on the etched surface at 320, e.g., using standard or conventional metal plating techniques and equipment, and the metal coating is attached to the etched surface at the plurality of micro-mechanical locking sites.

It should be understood from the teachings of the present disclosure that a thermoset resin for forming parts via VPP is provided. The thermoset resin provides for VPP parts that have a desired surface or surface finish that can be etched and subsequently metal plated. For example, the surface quality of the VPP parts is free of undesirable surface artifacts that show through a metal coating applied to the VPP parts. As used herein, the phrase "undesirable surface artifacts" refers to surface blemishes, lines and/or porosity resulting from the AM process(es) that forms the parts. Such AM processes include but are not limited to extrusion printing processes such as fusion filament formation (FFF) and fused deposition modeling (FDM), and powder bed fusion processes such as powder bed fusion (PBF), multi jet fusion (MJF), high speed sintering (HSS), and selective laser sintering (SLS).

In some variations, the thermoset resin is a mixture of monomers, oligomers, photoinitiators, and the etchable phase, and in at least one variation the etchable phase is at least one of organic particles, organic resins, inorganic particles, copolymers of the VPP thermoset polymer, and combinations thereof, among others. In some variations the etchable phase is a polybutadiene phase. In other variations the etchable phase is a mineral phase, for example, calcium carbonate.

In some variations the metal coating is applied on the etched surface using electroless deposition. For example, an electroless nickel coating can be applied or deposited on the etched surface. In such variations, electrolytic deposition of copper can be applied or deposited across the electroless deposited nickel. Also, electrolytic deposition of chromium can be applied or deposited onto the electrolytic deposited nickel.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thermoset resin for forming parts to be metal plated, the thermoset resin comprising:
    a vat photopolymerization (VPP) thermoset resin; and
    an etchable phase disposed in the VPP thermoset resin, wherein the etchable phase is configured to be etched from a surface of a part formed from the VPP thermoset resin such that a plurality of micro-mechanical locking sites is formed on the surface of the part.

2. The thermoset resin according to claim 1, wherein the VPP thermoset resin comprises a mixture of at least one monomer, at least one oligomer, and at least one photoinitiator.

3. The thermoset resin according to claim 1, wherein the VPP thermoset resin comprises at least one monomer selected from the group consisting of an (meth)acrylate monomer and a vinyl ether.

4. The thermoset resin according to claim 3, wherein the (meth)acrylate monomer is at least one of a monofunctional monomer, a difunctional monomer, and a multifunctional monomer.

5. The thermoset resin according to claim 3, wherein the (meth)acrylate monomer is at least one of 2-Ethyl hexyl acrylate (EHA), n-butyl acrylates (BA), 1,4-butanediol diacrylate (BDDA), diethyleneglycoldiacrylate (DEGDA), bisphenol A-glycidyl methacrylate (Bis-GMA), bisphenol A ethoxylate diacrylate (Bis-EDA), trimethylolpropane triacrylate (TTA), and triethylene glycol dimethacrylate (TEGDMA).

6. The thermoset resin according to claim 3, wherein the vinyl ether is at least one of diethyleneglycol divinyl ether (DEGDE), cyclohexane dimethanol divinyl ether (CHDMDE), and triethylene glycol divinyl ether (TEGDE).

7. The thermoset resin according to claim 1, wherein the VPP thermoset resin comprises at least one (meth)acrylated oligomer.

8. The thermoset resin according to claim 1, wherein the VPP thermoset resin comprises at least one oligomer selected from the group consisting of polyurethane, (meth)acrylate, polyether (meth)acrylate, polyester (meth)acrylate, epoxy (meth)acrylate, phenolic (meth)acrylate, amino (meth)acrylate, or silicone (meth) acrylate.

9. The thermoset resin according to claim 1, wherein the etchable phase is selected from the group consisting of organic particles, organic resins, inorganic particles, and copolymers of the VPP thermoset resin.

10. The thermoset resin according to claim 1, wherein the etchable phase is at least one of (meth)(acrylates selected from the group consisting of polybutadiene (meth)acrylate, polyisoprene (meth)acrylate, polychlorprene (meth)acrylate, unsaturated polyester (meth)acrylate, and alkyd (meth)acrylate, and (meth)acrylated polymers with backbones or sidechains having an unsaturated double bond function group ($-CH_2=CH_2-$).

11. The thermoset resin according to claim 1, wherein the etchable phase is at least one of metal particles selected from the group consisting of iron (Fe) and aluminum (Al), metal oxide particles selected from the group consisting of alumina ($Al_2O_3$), magnesium oxide (MgO) and zinc oxide (ZnO), and metal carbonate particles selected from the group consisting of calcium carbonate ($CaCO_3$), barium carbonate ($BaCO_3$), and magnesium carbonate ($MgCO_3$).

12. The thermoset resin according to claim 1 further comprising a component formed from the VPP thermoset resin with the etchable phase disposed therein.

13. The thermoset resin according to claim 12, wherein the component has an etched surface and a metal coating disposed on the etched surface.

14. The thermoset resin according to claim 12, wherein the metal coating is a chromium coating.

15. The thermoset resin according to claim 12, wherein the metal coating is a layer of nickel, a layer of copper and a layer of chromium.

16. A metal plated polymer part comprising:
   a vat photopolymerization (VPP) thermoset substrate formed from a mixture of at least one monomer, at least one oligomer, at least one photoinitiator, and an etchable phase; and
   a metal coating on a surface of the VPP thermoset substrate, wherein the surface is an etched surface with a plurality of micro-mechanical locking sites and the metal coating is bonded to the surface at the plurality of micro-mechanical locking sites.

17. The metal plated polymer part according to claim 16, wherein the VPP thermoset substrate is formed from a VPP thermoset resin comprising at least one monomer selected from the group consisting of an (meth)acrylate monomer and a vinyl ether.

18. The metal plated polymer part according to claim 17, wherein the (meth)acrylate monomer is at least one of 2-ethyl hexyl acrylate (EHA), n-butyl acrylates (BA), 1,4-butanediol diacrylate (BDDA), diethyleneglycoldiacrylate (DEGDA), and bisphenol A-glycidyl methacrylate (Bis-GMA), bisphenol A ethoxylate diacrylate (Bis-EDA), trimethylolpropane triacrylate (TTA), and triethylene glycol dimethacrylate (TEGDMA), and the vinyl ether is at least one of diethyleneglycol divinyl ether (DEGDE), cyclohexane dimethanol divinyl ether (CHDMDE), and triethylene glycol divinyl ether (TEGDE).

19. The metal plated polymer part according to claim 17, wherein the VPP thermoset resin comprises at least one oligomer selected from the group consisting of polyurethane (meth)acrylate, polyether (meth)acrylate, polyester (meth)acrylate, epoxy (meth)acrylate, phenolic (meth)acrylate, amino (meth)acrylate, and silicone (meth) acrylate.

20. The metal plated polymer part according to claim 16, wherein the etchable phase is selected from the group consisting of polybutadiene (meth)acrylate, polyisoprene (meth)acrylate, polychlorprene (meth)acrylate, unsaturated polyester (meth)acrylate, alkyd (meth)acrylate, (meth)acrylated polymers with backbones or side chains comprising unsaturated double bond function group ($—CH_2=CH_2—$), iron (Fe), aluminum (Al), alumina ($Al_2O_3$), magnesium oxide (MgO), zinc oxide (ZnO), calcium carbonate ($CaCO_3$), barium carbonate ($BaCO_3$), and magnesium carbonate ($MgCO_3$).

* * * * *